(12) United States Patent
Yamauchi et al.

(10) Patent No.: US 7,124,133 B2
(45) Date of Patent: Oct. 17, 2006

(54) REMOTE ACCESS PROGRAM, REMOTE ACCESS REQUEST-PROCESSING PROGRAM, AND CLIENT COMPUTER

(75) Inventors: Katsutoshi Yamauchi, Aichi (JP); Yoshitake Kawase, Aichi (JP); Isao Hosokawa, Aichi (JP)

(73) Assignee: Fujitsu Limited, Kawasaki (JP)

( * ) Notice: Subject to any disclaimer, the term of this patent is extended or adjusted under 35 U.S.C. 154(b) by 345 days.

(21) Appl. No.: 10/117,835

(22) Filed: Apr. 8, 2002

(65) Prior Publication Data
US 2003/0078944 A1 Apr. 24, 2003

(30) Foreign Application Priority Data
Oct. 19, 2001 (JP) ............................. 2001-321407

(51) Int. Cl.
*G06F 7/00* (2006.01)
*G06F 15/16* (2006.01)
(52) U.S. Cl. .................... 707/10; 707/100; 707/200; 709/227; 709/230
(58) Field of Classification Search ............... 707/10, 707/200, 104.1, 100; 709/227–230
See application file for complete search history.

(56) References Cited

U.S. PATENT DOCUMENTS

| 5,463,772 | A | * | 10/1995 | Thompson et al. ......... 707/101 |
| 5,778,384 | A | * | 7/1998 | Provino et al. ............. 707/200 |
| 5,870,734 | A | * | 2/1999 | Kao ........................... 707/200 |
| 6,044,367 | A | * | 3/2000 | Wolff ............................. 707/2 |
| 6,260,120 | B1 | * | 7/2001 | Blumenau et al. .......... 707/101 |
| 6,356,863 | B1 | * | 3/2002 | Sayle ......................... 707/10 |
| 6,389,420 | B1 | * | 5/2002 | Vahalia et al. ................. 707/8 |
| 6,601,101 | B1 | * | 7/2003 | Lee et al. ................... 709/227 |
| 6,718,372 | B1 | * | 4/2004 | Bober ........................ 709/217 |
| 6,826,613 | B1 | * | 11/2004 | Wang et al. ................ 709/227 |
| 2002/0040389 | A1 | * | 4/2002 | Gerba et al. ................ 709/219 |
| 2002/0083120 | A1 | * | 6/2002 | Soltis ........................ 709/200 |
| 2002/0120763 | A1 | * | 8/2002 | Miloushev et al. ......... 709/230 |
| 2002/0133491 | A1 | * | 9/2002 | Sim et al. ..................... 707/10 |
| 2002/0198897 | A1 | * | 12/2002 | Geuss et al. ................ 707/200 |
| 2003/0149765 | A1 | * | 8/2003 | Hubbard et al. ............ 709/224 |
| 2004/0133570 | A1 | * | 7/2004 | Soltis ............................ 707/3 |

* cited by examiner

*Primary Examiner*—Jean M. Corrielus
*Assistant Examiner*—Anh Ly
(74) *Attorney, Agent, or Firm*—Greer, Burns & Crain, Ltd.

(57) ABSTRACT

A client computer is capable of designating one of a plurality access paths via respective servers on a file-by-file basis. The client computer defines a plurality of access paths to the storage device by way of the respective server computers (step S1). Next, when an access request defining a file within the storage device is received, the client computer determines a relay server computer which should provide an access path to the file, out of the server computers, according to a predetermined rule for distributing accesses to the storage device among the plurality of access paths on a file-by-file basis (step S2). Then, the client computer accesses the file within the storage device by the access path via the designated relay server computer.

10 Claims, 16 Drawing Sheets

140  ACQUIRED FILE ID MANAGEMENT TABLE

| PATH | FILE NAME | FILE ID |
|---|---|---|
| /dir-1 | File-1 | FileID-17 |
| /dir-1 | File-2 | FileID-23 |
| ⋮ | ⋮ | ⋮ |

FIG. 6

170 ALTERNATE SERVER NODE TABLE

| SERVER NODE NAME | FILE SYSTEM | FILE ID |
|---|---|---|
| SVR-1 | FS-1 | FileID-1 |
| SVR-1 | FS-1 | FileID-2 |
| ⋮ | ⋮ | ⋮ |
| SVR-n | FS-n | FileID-n |

FIG. 7

222   REMOTE MOUNT IFNORMATION TABLE

| CLIENT NODE NAME | IP ADDRESS | FILE SYSTEM |
|---|---|---|
| CLT-1 | uuu.uuu.uuu.uuu | FS-1 |
| CLT-2 | vvv.vvv.vvv.vvv | FS-1 |
| ... | ... | ... |
| CLT-8 | www.www.www.www | FS-1 |

FIG. 8

226 REPLACEMENT FILE TABLE

| FILE SYSTEM | FILE ID |
|---|---|
| FS-1 | FileID-1 |
| FS-2 | FileID-2 |
| ⋮ | ⋮ |
| FS-3 | FileID-n |

FIG. 9

REMOTE ACCESS PROGRAM, REMOTE ACCESS REQUEST-PROCESSING PROGRAM, AND CLIENT COMPUTER

BACKGROUND OF THE INVENTION

1. Field of the Invention

This invention relates to a remote access program, a remote access request-processing program, and a client computer, for carrying out remote access, and more particularly to a remote access program, a remote access request-processing program, and a client computer, for using a storage device connected to a plurality of server computers.

2. Description of the Related Art

As a file system enabling resources to be used in a shared manner via a network, NFS (Network File System) is generally used. In an NFS network, a storage device is connected to a server computer (hereinafter, simply referred to as "the server"). This storage device is provided for use by another client computer (hereinafter simply referred to as "the client") connected to the storage device via the network as a resource on the server.

A client which makes use of the NFS mounts a resource on the server at a mount point on the client (in the case of a UNIX (registered trademark)-based OS (Operating System)). This enables the user of the client to access the resource on the server via the mount point, in the same manner as in the local file system. At this time, only one server can be designated for one mount point.

By the way, as a system which enables the direct shared use of a storage device, such as a magnetic disk, from a plurality of nodes of a network, a SAN (Storage Area Network) has been conventionally used. The SAN is capable of causing the whole network to serve as a file server. In this case, a plurality of servers constituting the SAN can each play the roll of a file server. At this time, a client can access the storage device provided by the SAN by designating a desired one of the servers for one mount point.

It should be noted that there is a case in which a large number of clients are connected to a network. In such a case, for each client to access a resource on servers constructed by the SAN, by the NFS, it is necessary to distribute designated servers among the servers on a client-by-client basis or a mount point-by-mount point basis, so as to prevent load from being concentrated on one server.

However, even if the designated servers providing access to the resource are distributed among the servers on a client-by-client basis or a mount point-by-mount point basis, the biased or non-uniform use by the clients can result in a large number of accesses which are made via only one specific server. That is, if a plurality of clients which have designated the same server simultaneously accesses the resource provided by the SAN, even if the other servers are each well within the processing capacity thereof, the access is only permitted via the server designated by the clients beforehand. Therefore, even when the SAN as a whole is well within the processing capacity, the processing speed is lowered.

Further, assuming that the servers are distributed on a client-by-client basis, if the same resource is accessed by them, the same file (data) are controlled by the plurality of servers, which makes it difficult to ensure the consistency of the file (data).

Further, there is a strong demand for a system in which a processing request from a client which has designated a server as an access point is automatically switched to another server, in the event that the server has undergone a system shut down due to failure or the like.

SUMMARY OF THE INVENTION

The present invention has been made in view of these circumstances, and an object thereof is to provide a remote access program and a client computer which are capable of designating a plurality of access paths via respective servers, on a file-by-file basis.

A further object of the invention is to provide a remote access request-processing program which is capable of notifying client computers of a change in access paths designated on a file-by-file basis.

To attain the first-mentioned object, there is provided a remote access program for accessing a common storage device via a plurality of server computers each providing a function of accessing the common storage device. The remote access program is characterized by causing a computer to execute a process for defining a plurality of access paths to the storage device via the respective server computers, determining, when an access request designating a file within the storage device is received, a relay server computer which provides an access path to the file, out of the server computers, according to a predetermined rule for distributing accesses to the storage device among the plurality of access paths on a file-by-file basis, and accessing the file within the storage device by the determined access path via the determined relay server computer.

Further, to attain the second-mentioned object, there is provided a remote access request-processing program for providing a function of accessing a storage device. The remote access request-processing program is characterized by causing a computer to execute a process for making a list of client computers which desire to be provided with the function of accessing the storage device, notifying, when information of an alternate file for which the computer provides the function of accessing the storage device in place of another server computer, each of the client computers registered in the list, that the computer carries out processing for providing the function of accessing the alternate file, and providing the function of accessing files designated in advance according to a predetermined rule and the alternate file, out of files within the storage device, to the client computers registered in the list.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram showing an example of an acquired file ID management table;

FIG. 7 is a diagram showing an example of an alternate server node table;

FIG. 8 is a diagram showing an example of a remote mount information table;

FIG. 9 is a diagram showing an example of a replacement file table;

DESCRIPTION OF THE PREFERRED EMBODIMENTS

The invention will now be described in detail with reference to the drawings showing a preferred embodiment thereof.

First, the outline of the invention applied to the preferred embodiment will be described, and then, details of the preferred embodiment will be described.

Figure 1:
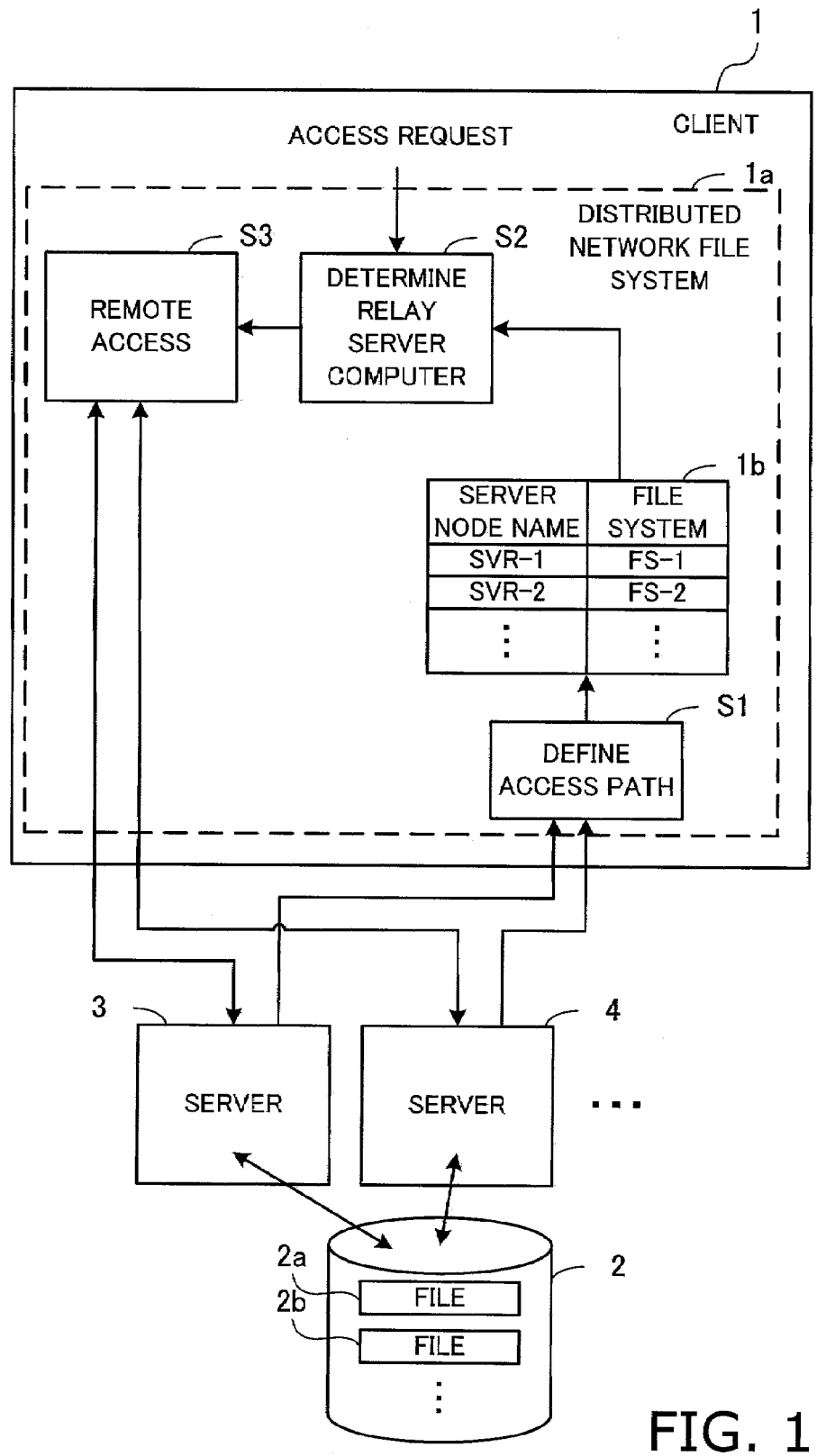
FIG. 1 is a conceptual representation of the invention which is applied to an embodiment thereof.

FIG. 1 is a conceptual representation of the invention applied to the embodiment. A client computer (client) 1 is capable of accessing files 2a, 2b, . . . stored in a storage device 2 via a plurality of server computers (servers) 3, 4, . . . by executing a remote access program.

Within the client 1, a distributed network file system 1a is constructed by executing a remote access program. The distributed network file system 1a defines a plurality of access paths for accessing the storage device 2 via the plurality of servers 3, 4, . . . , respectively (step S1). To define an access path is intended to mean e.g. to mount file systems on the respective servers 3, 4, . . . , at a mount point.

Contents of the definition of access paths are managed e.g. by using a table 1b. The information of each access path registered in the table 1b includes e.g. identification information (e.g. server node name on the network) of a server which should deliver a remote access request, and identification information (e.g. file system name) of a file system by which the storage device 2 is managed by the server.

Thereafter, when the client 1 receives an access request designating any of the files 2a, 2b, . . . , within the storage device 2, it determines a relay server which provides an access path to the designated one of the files 2a, 2b, . . . , out of the plurality of servers 3, 4, . . . , according to a predetermined rule for distributing accesses to the storage device among a plurality of access paths on a file-by-file basis (step S2). In short, a server (relay server) providing an access path to the target file is assigned to the target file.

The predetermined rule may be implemented e.g. by a calculating equation which uses a file ID (Identification) number set to the target file in advance, and the number of the servers 3, 4, . . . , providing the access paths as variables. When there are a plurality of clients 1, all the clients 1 employ a common rule as the rule for determining a relay server. This unifies relay servers associated with the files 2a, 2b, . . . , for all the clients 1.

Next, the client 1 carries out remote access to the designated one of the files 2a, 2b, . . . , within the storage device 2 by the access path via the determined relay server (step S3).

If the remote access is carried out in this manner, remote accesses to the files 2a, 2b, . . . , within the storage device 2 are distributed among the plurality of servers 3, 4, . . . , on a file-by-file basis. As a result, even when the client 1 makes a large number of accesses to the storage device 2, they are processed by the servers 3, 4, . . . , with efficiency.

It should be noted that when a relay server is halted, the processing to be carried out by the relay server during the halt can be caused to carried out by another server for the halted server. In this case, the client 1 determines an alternate server which carries out the processing of the halted relay server in place thereof. Then, the client 1 accesses one of the files 2a, 2b, . . . within the storage device 2 which has been designated by the access request, via the access path by way of the determined alternate server.

Further, when the client 1 performs remote access to a file via an alternate server, remote access to the file by another client may be also carried out via the alternate server. In this case, information of the file which should be accessed via the alternate server is notified to all the clients, and based on the information, all the clients access the file the information of which has been thus notified, via the alternate server. This causes access to one file to be always carried out via one server, which ensures the consistency of the data of the file.

It should be noted that the notification of information of a file which should be accessed via an alternate server to all the clients can be effected by the alternate server. For instance, each of the servers 3, 4, . . . , forms beforehand a list of clients which desire to be provided with the function of accessing the storage device 2 thereby. When any of the servers 3, 4, . . . receives information of a file (alternate file) within the storage device 2 for which the server should provide the function of accessing the file in place of another server, the server notifies all the clients registered in its list that the server provides the function of accessing the alternate file in place of the other server. Then, the sever provides the function of accessing files designated in advance by the predetermined rule and the alternate file, out of the files 2a, 2b, . . . within the storage device 2, for the clients registered in its list.

The process of distributing remote accesses can be applied to accesses via a network to resources provided by a SAN. Hereafter, a preferred embodiment of the invention will be described in detail based on a case in which the distributing process of the present invention is applied to a process for allowing a plurality of client computers to make use of a shared resource provided by a SAN.

Figure 2:
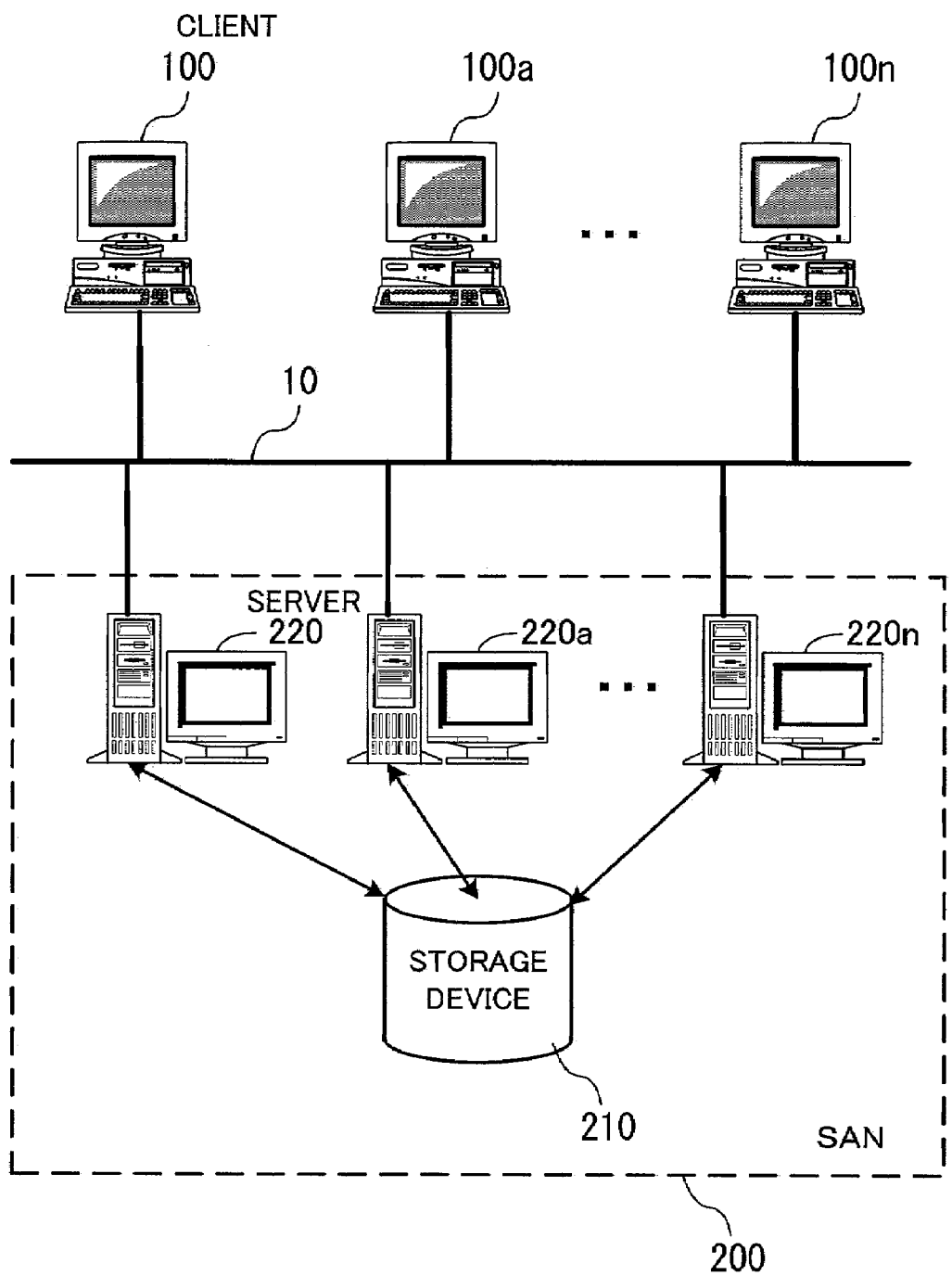
FIG. 2 is a diagram showing a system configuration according to an embodiment of the invention.

FIG. 2 shows a system configuration of the present embodiment in which a plurality of clients 100, 100a, . . . , 100n are connected via a network 10 to a SAN 200.

In the SAN 200, a plurality of servers 220, 220a, . . . , 220n are connected to a storage device 210. The storage device 210 stores a plurality of files in a data structure adapted to a predetermined file system. The file system varies with the operating system (OS). For instance, a UNIX-based OS uses ufs (file system compatible with 4.3 BSD (Berkley Software Distribution), Extended file system (ext, ext2, ext3) or the like.

The plurality of severs 220, 220a, . . . , 220n are each connected to the network 10, and provide an access environment for accessing the files stored in the storage device to the clients 100, 100a, . . . , 100n via the network 10.

Figure 3:
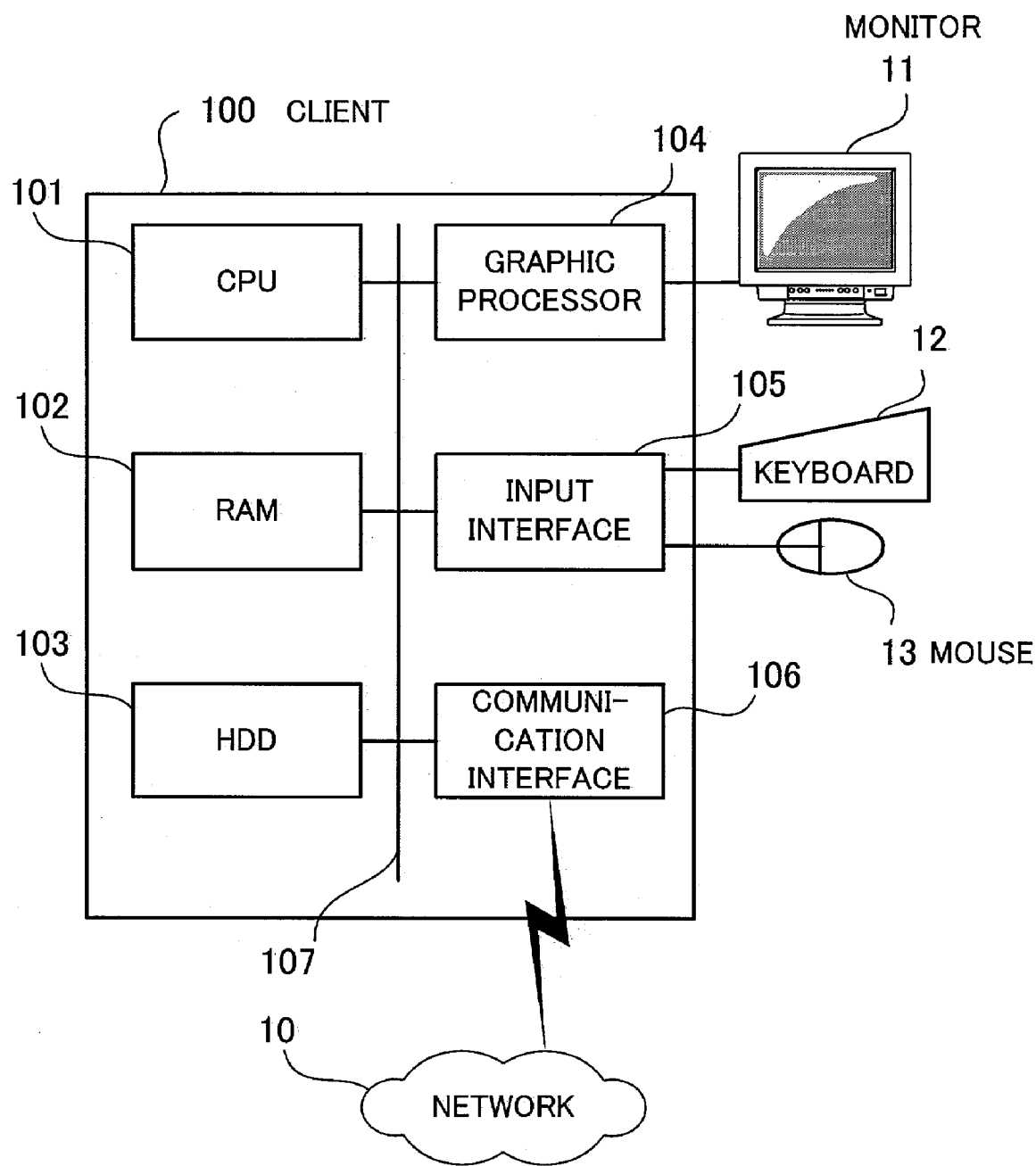
FIG. 3 is a diagram showing an example of a hardware configuration of a client used in the embodiment.

FIG. 3 shows an example of a hardware configuration of a client used in the present embodiment. The client 100 has its overall operations controlled by a CPU (Central Processing Unit) 101. The CPU 101 has a RAM (Random Access Memory) 102, an HDD (Hard Disk Drive) 103, a graphic processor 104, an input interface 105, and a communication interface 106 connected thereto via a bus 107.

The RAM 102 temporarily stores programs of the OS (Operating System) and at least part of application programs which are executed by the CPU 101. Further, the RAM 102 stores various data necessary for processing by the CPU 101. The HDD 103 stores the OS and application programs.

The graphic processor 104 is connected to a monitor 11. The graphic processor 104 displays an image on the screen of the monitor 11. The input interface 105 is connected to a keyboard 12 and a mouse 13. The input interface 105 sends signals received from the keyboard 12 and the mouse 13 to the CPU 101 via the bus 107.

The communication interface 106 is connected to the network 10. The communication interface 106 sends and receives data to and from the servers 220, 220a, . . . , 220n via the network 10.

The hardware configuration described above can realize the processing function of the present embodiment. It should be noted that although FIG. 3 shows the hardware configuration of the client 100 as a representative of the clients, the other clients 100a, 100b, . . . , 100n can be also realized by a similar hardware configuration. The servers 220, 220a, . . . , 220n have almost the same hardware configuration, except that they incorporate interfaces for an external storage device, and are connected to the storage device 210 via the respective interfaces thereof.

Figure 4:
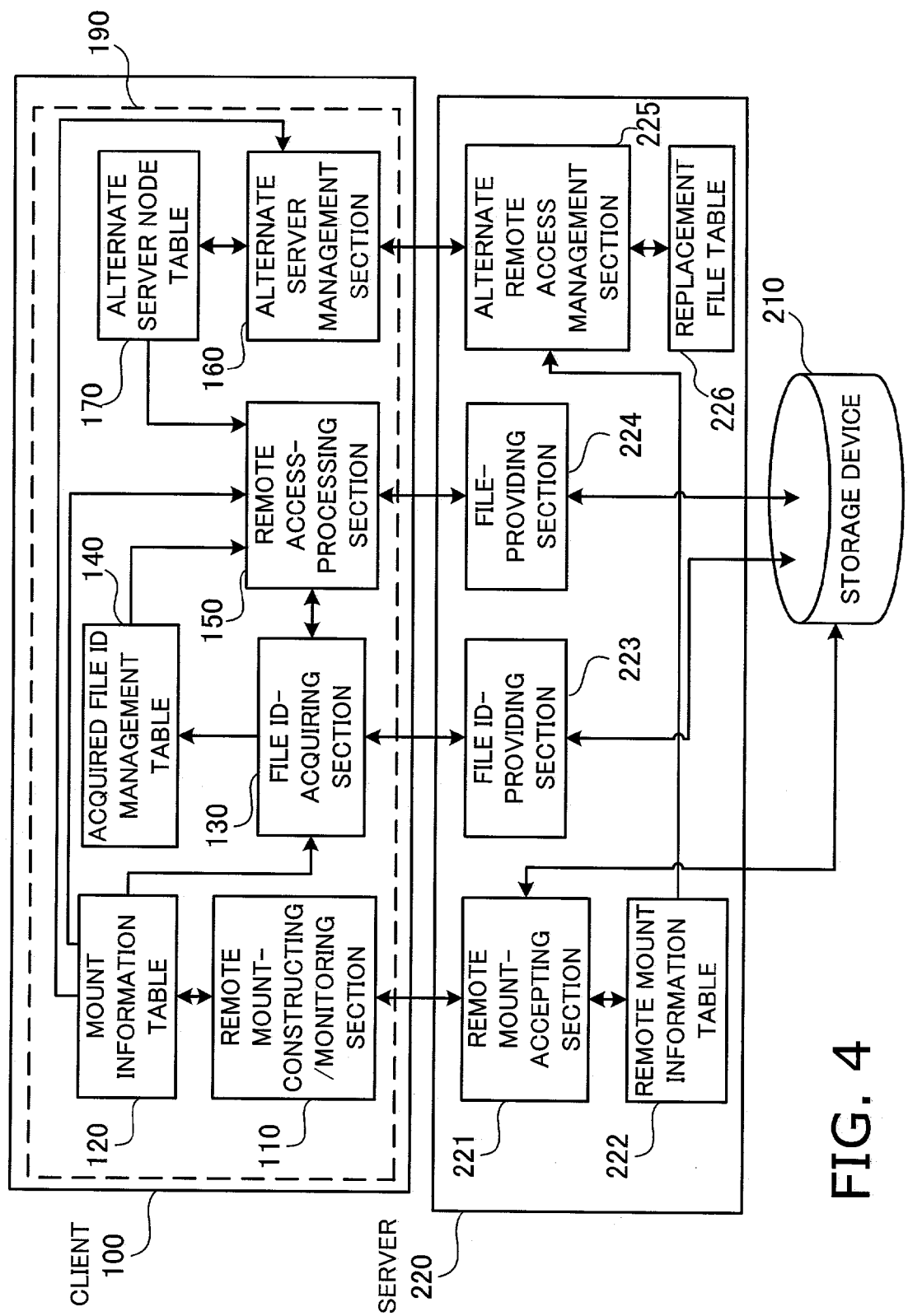
FIG. 4 is a functional block diagram showing the functional blocks of the client and a server, according to the embodiment.

FIG. 4 shows a functional block diagram illustrating functions of the client and server of the present embodiment.

The client 100 has a remote mount-constructing/monitoring section 110, a mount information table 120, a file ID-acquiring section 130, an acquired file ID management table 140, a remote access-processing section 150, an alternate server management section 160, and an alternate server node table 170. It should be noted that the components shown in the client 100 construct a distribution network file system 190.

The remote mount-constructing/monitoring section 110 carries out remote mounting of file systems in the servers 220, 220a, . . . , 220n at one access point in the client under its local file system. When executing remote mounting e.g. of the server 200, the remote mount-constructing/monitoring section 110 issues a remote mount request to the server 220. When the remote mounting process is completed, the section 110 receives the name of the file system in the server 220 and the like from the server 220, and generates a mount information table 120 concerning the remote mount.

Further, the remote mount-constructing/monitoring section 110 monitors the statuses (operative or halted) of the servers 220, 220a, . . . , 220n thus remote-mounted, and registers the monitored statuses in the mount information table 120.

The mount information table 120 registers information concerning the remote-mounted servers 220, 220a, . . . , 220n, and the file systems provided by the servers 220, 220a, . . . , 220n. It should be noted that within the mount information table 120 of each client, items of information of the servers 220, 220a, . . . , 220n are arranged in a predetermined order (common to all the clients).

Further, the mount information table 120 registers the statuses of the servers 220, 220a, . . . , 220n and information indicative of a master server. The master server means a server which notifies the respective file ID numbers of the files within the storage device 210 to the clients 100, 100a, . . . , 100n. The file ID numbers are assigned to the respective files, so as to enable a local file system, such as ufs, to manage the files by the numbers, and are usually called i node numbers. The master server is one of the normally operating servers.

The file ID-acquiring section 130 delivers, in response to a request to acquire a file ID number from the remote access-processing section 150, a file ID-acquiring request to the master server, and thereby acquires the file ID number from the master server. The file ID-acquiring section 130 registers the acquired file ID number in the acquired file ID management table 140.

The acquired file ID management table 140 has the respective file ID numbers of files accessed by the client 100 in the past registered therein. The registration of the file ID numbers in the acquired file ID management table 140 makes it unnecessary to acquire a file ID from the master server whenever the same file is repeatedly accessed.

Responsive to an access request from another application software program or a process for executing interactive processing, the remote access-processing section 150 accesses the storage device 210 provided by the SAN 200. The access to the storage device 210 is executed via one of the servers 220, 220a, . . . , 220n.

In the present embodiment, an access path is determined by a predetermined calculation based on the file ID number of a target file to be accessed and the number of the servers constructing the SAN 200. To this end, the remote access-processing section 150 acquires a file ID number of the target file prior to the delivery of a remote access request to the SAN 200. If the target file has been registered in the acquired file ID management table 140, the remote access-processing section 150 acquires the file ID number of the target file from the table 140. Further, if the target file has not been registered in the table 140, the remote access-processing section 150 issues a request to acquire the file ID number to the file ID-acquiring section 130, thereby acquiring the file ID number from the file ID-acquiring section 130.

After receiving the file ID number, the remote access-processing section 150 divides the numerical value of the file ID number by the number of the servers to obtains a remainder therefrom, and then determines an access path via a sever (relay server) whose place in a sequence of the servers corresponds to a number obtained by adding 1 to the remainder, as the access path to the file. The file ID number is unique to a file, and the order of a sequence of the servers is common to all the clients 100, 100a, . . . , 100n, and hence an access path to a specific file is identical for all the clients 100, 100a, . . . , 100n.

After determining the access path, the remote access-processing section 150 issues a remote access request to the server corresponding to the determined access path. If the remote access request is for writing in the file, the contents of the file are transferred to the server together with the remote access request. If the remote access request is for reading the file, the requested file is sent from the server. In this case, the remote access-processing section 150 receives the file sent from the server and hands it over to the process issuing the access request.

It should be noted that when a relay server is halted, the remote access-processing section 150 performs the remote access via an alternate server. Further, so long as a file registered in the alternate server node table 170 is concerned, the section 150 performs the remote access via an alternate server designated in the alternate server node table 170.

The alternate server management section 160 judges, based on the contents of the mount information table 120, whether or not there is a server which has ceased to be capable of communication due to a system down or the like. If a server incapable of communication occurs, the alternate server management section 160 generates an alternate server node table 170 associated with the server. Then, the alternate server management section 160 determines another server which should be caused to carry out the processing which the server incapable of communication should carry out, for the down server, and issues a request for generation of a replacement file table to the determined server.

Further, the alternate server management section 160 also generates the alternate server node table 170 when an alternate server node table-generating request is received from the server 220. In this case, based on a list of replacement files which are contained in the alternate server node table-generating request and for which the server should be replaced by an alternate server, the information of the alternate server for the files is registered in the alternate server node table 170 so as to cause the server 220 who issued the alternate server node table-generating request to carry out the remote access in place of the halted server.

The alternate server node table 170 stores information of servers other than a server incapable of communication, which are caused to perform the processing of the halted server concerning the remote access. Information of the servers to be caused to serve as the alternate servers is managed for target files for remote access, on a file-by-file basis. The alternate server node table 170 is generated for each of halted or down servers.

The server 220 has a remote mount-accepting section 221, a remote mount information table 222, a file ID-providing section 223, a file-providing section 224, an alternate remote access management section 225, and a replacement file table 226.

The remote mount-accepting section 221 provides a remote access environment, i.e. a remote access enabled status in which the client 100 is allowed to access the storage device 210 via the network 10 (see FIG. 2) in response to a remote access request from the client 100. In other words, the remote mount-accepting section 221 mounts the storage device 210, and enables the file-providing section 224 to access the files within the storage device 210.

Further, the remote mount-accepting section 221 notifies a file system name controlling the mounted region (partitions within each device are assigned unique names within the server, respectively) to the remote mount-constructing/monitoring section 110 of the client 100 together with completion of accepting the remote mount reception. Further, the section 221 registers the identification information (client node name or the like) of the client 100 having requested the remote mount in the remote mount information table 222.

The remote mount information table 222 stores information for managing a list of clients having remote-mounted the server 220. The remote mount information table 222 registers identification information of clients, and a file system name of the storage device 210 as a target of the remote mount, etc.

The file ID-providing section 223 acquires the file ID number of a file designated by the request of the client 100 to acquire the same, from the storage device 210, and notifies the acquired file ID number to the client 100. It should be noted that the file ID number can be obtained by referring to the file management information provided in the storage device 210. For instance, the storage device 210 registers the list of files in each directory and respective file ID numbers of the files in a manner correlated with each other.

Responsive to a remote access request from the client 100, the file-providing section 224 carries out an inputting or outputting operation for a file within the storage device 210 designated by the request. If the request is for reading, the file-providing section 224 fetches the designated file from the storage device 210 and transmits the same to the client 100.

Upon reception of the request to generate a replacement file table from the client 100, the alternate remote access management section 225 generates a replacement file table 226 for management of a list of files for which the server 220 (in the illustrated example) should act as the alternate server. When a remote file access is performed by the server 220 as the alternate server and the contents of the replacement file table 226 are updated, the alternate remote access management section 225 looks up the remote mount information table 222 and acquires the list of clients having remote mounted the server 220. Then, the alternate remote access management section 225 delivers a request to generate an alternate server node table to each of the clients other than the client having requested the server 220 to act as an alternate server. The request to generate the alternate server node table contains the contents of the replacement file table 226.

The replacement file table 226 stores information of files for which the server should act as an alternate server due to a halt of other servers associated with the files.

Next, an example of the construction of data of each table generated by the client 100 and the server 220 will be described.

Figure 5:
FIG. 5 is a diagram showing an example of a mount information table.

FIG. 5 shows an example of the mount information table. In the illustrated example, the mount information table 120 has the columns of "server node name", "IP (Internet Protocol) address", "file system", and "status". Items of information stored at a row of boxes on the respective columns are correlated with each other.

The "server node name" is the name of a server (node name) which has been remote-mounted. The node name uniquely identifies a server on the network. The node name is e.g. a domain name used in the Internet. The node names are arranged in a predetermined order. The order of a sequence of the nodes is common to all the respective mount information tables of the clients 100, 100a, . . . , 100n.

The "IP address" is the IP address of the server. The IP address has a value uniquely assigned to a corresponding one of the servers in the network 10.

The "file system" is the name of a file system (file system name) managing the storage device 210 at the remote-mounted server.

The "status" is information indicative of the operating status of the server and designation of the master server. The "status" is set to one of "ACTIVE", "BROKEN", and "MASTER". The "ACTIVE" indicates an active status of communications with the corresponding server which makes it possible to access files managed by the file system of the server. The "BROKEN" shows a status of broken communication with the corresponding server which makes it impossible to access files managed by the file system of the server. The "MASTER" indicates that the corresponding server is a server from which file ID numbers should be acquired (master server).

The master server is one of servers which are in the "ACTIVE" status, and during broken communication therewith, another server becomes a master server. In the present embodiment, a server in a next place to the current master server in the sequence of servers takes over the role of the master server. In the example shown in FIG. 5, the server having a server node name of "SVR-1" is the master server.

FIG. 6 shows an example of the acquired file ID management table. In the illustrate example, the acquired file ID management table 140 contains columns of "path", "file name", and "file ID", and items of information in a row of boxes on the respective columns are correlated to each other.

The "path" indicates a path of a file to which remote access was made in the past, and includes information of a path (route) starting from a root directory of the data structure of the storage device 210 to a directory where the target file is stored.

The "file name" indicates the name of a file to which the remote access was made in the past.

The "file ID" is a file ID number which was acquired from the master server concerning the file to which remote access was made in the past.

FIG. 7 shows an example of the alternate server node table. In the illustrated example, the alternate server node table 170 contains columns of "server node name", "file system", and "file ID" and items of information in a row of boxes on the respective columns are correlated to each other. It should be noted that alternate server node tables 170 are generated in a fashion associated with respective servers communications with which are broken.

The "server node name" is the name of a server (alternate server) that carries out remote access as an alternate server based on the alternate server node table 170.

The "file system" is the name of a file system on the alternate server which manages a target file to which it performs remote access.

The "file ID" is the file ID number of a file to which the alternate server performs remote access.

FIG. 8 shows an example of the remote mount information table. In the illustrated example, the remote mount information table 222 contains columns of "client node name", "IP address" and "file system", and items of information in a row of boxes on the respective columns are correlated to each other.

The "client node name" is the name of a client which has remote-mounted e.g. the server 220.

The "IP address" is the IP address of an associated client. The "file system" is the name of a file system under which the associated client has carried out remote mounting.

FIG. 9 shows an example of the replacement file table. In the illustrated example, the replacement file table 226 contains columns of "file system" and "file ID", and items of information in a row of boxes on the respective columns are correlated to each other.

The "file system" is the name of a file system which manages a file to which remote access should be carried out by an alternate server.

The "file ID" is the file ID number of the file to which remote access should be carried out by the alternate server.

The system constructed above and using the data structures described above carries out remote access by switching access paths on a file-by-file basis. Now, the remote access process of the present embodiment will be described in detail. In the following description, it is assumed that the number of clients connected to the network 10 is 8, and the number of servers is also 8.

Figure 10:
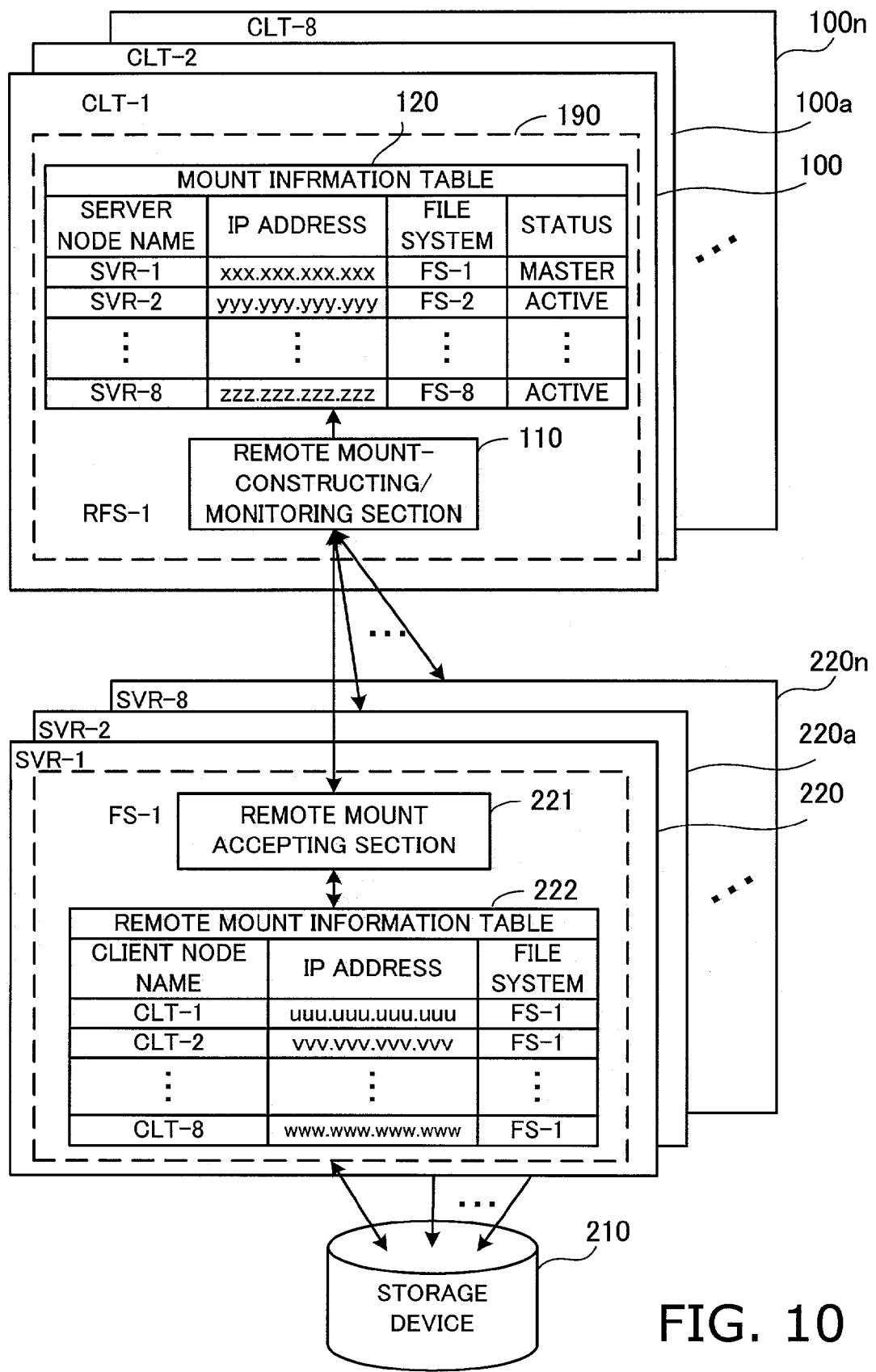
FIG. 10 is a conceptual representation of a remote mount process.

FIG. 10 is a conceptual representation of the remote amount process. The remote mount process is carried out by clients 100, 100a, . . . , 100n as to the servers 220, 220a, . . . , 220n.

For instance, when the remote mount-constructing/monitoring section 110 of the client 100 issues a remote mount request to the server 220, the request is received by the remote mount-accepting section 221 of the server 220. Then, the remote mount-accepting section 221 mounts the storage device 210, and at the same time generates a remote mount information table 222. As the clients 100, 100a, . . . , 100n issue a remote mount request, the remote mount information table 222 registers items of information associated with the clients 100, 100a, . . . , 100n, respectively.

The remote mount-accepting section 221 having established the remote mounted status returns the name (FS-1) of the file system managing the storage device 210 to the clients 100, 100a, . . . , 100n. In the client 100, the remote mount-constructing/monitoring section 110 having received the file system name registers the information of remote mount effected via the server 220 in the mount information table 120. At this time, in a corresponding box on the column of the "status", "ACTIVE" or "MASTER" is set.

Thus, when the remote mount concerning the SAN 200 is carried out by the client 100, it is not one node of the servers 220, 200a, . . . , 220n on the SAN 200 but all the nodes thereon that are selected as file servers. Then, when the remote mount is successful, the mount information table 120 is provided in the client 100 for managing the information of the mounted servers. Within the server 220, the remote mount information table 222 is formed.

Figure 11:
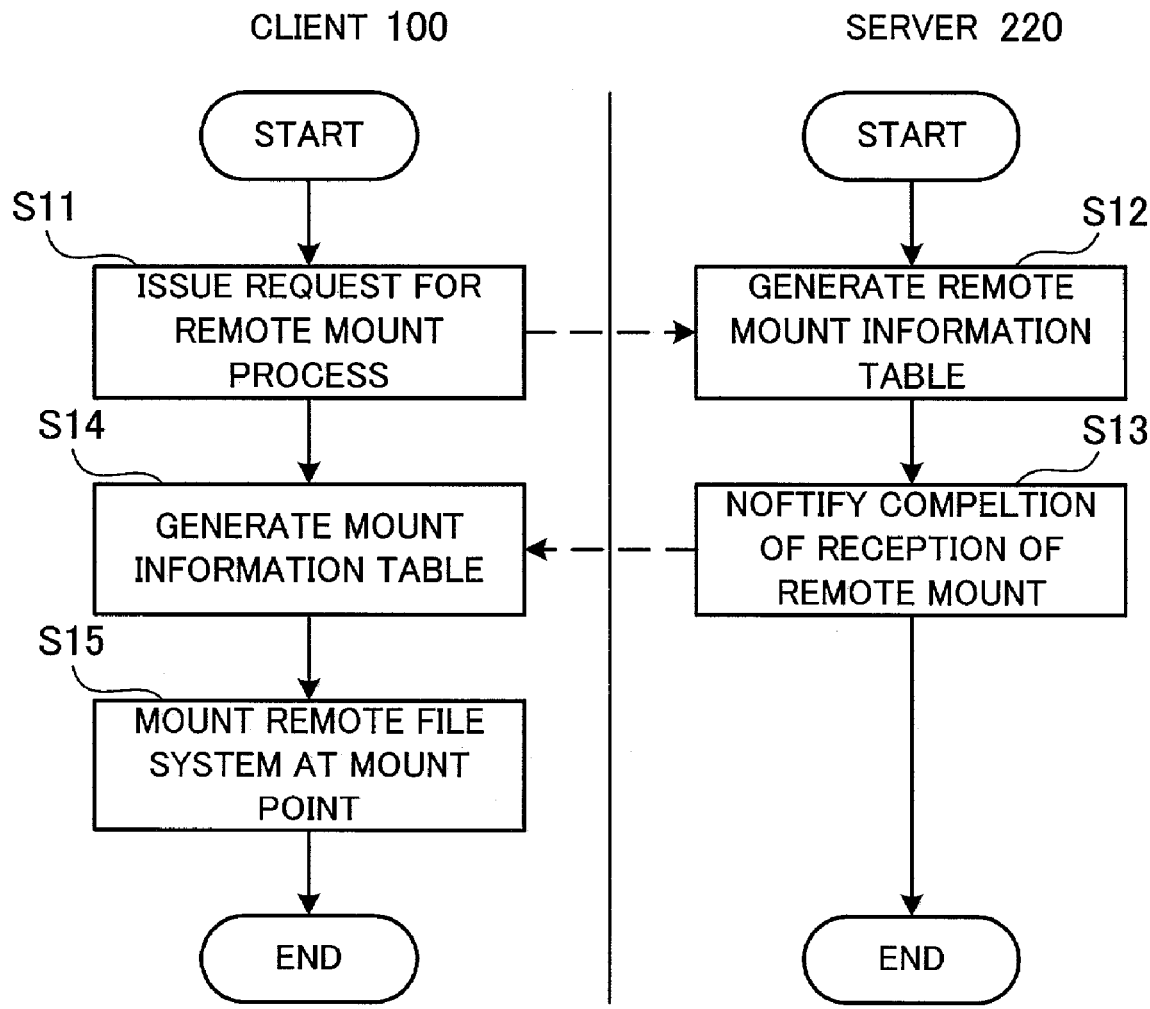
FIG. 11 is a sequence diagram showing a procedure of the remote mount process.

FIG. 11 is a sequence diagram showing a procedure of the remote mount process. This diagram shows an example of the process carried out between the client 100 and the server 220. Hereafter, the illustrated sequence will be described in the order of step numbers thereof.

[Step S11] The remote mount-constructing/monitoring section 110 of the client 100 issues a request for a remote mount process to the server 220. It should be noted that this request contains information of the node name (CLT-1) and the IP address (uuu.uuu.uuu.uuu) of the client 100.

[Step S12] The remote mount-accepting section 221 of the server 220 generates a remote mount information table 222.

[Step S13] The remote mount-accepting section 221 of the server 220 notifies the completion of the remote mount to the client 100. The notification of the completion of the remote mount contains information of the node name (SVR-1), IP address (xxx.xxx.xxx.xxx), and the file system name (FS-1) of the server 200.

[Step S14] The remote mount constructing/monitoring section 110 of the client 100 registers the information of the server 220 and the file system (FS-1) in the mount information table 120.

[Step S15] The client 100 mounts the distributed network file system (RFS-1) at a mount point.

Thus, the remote mount is carried out, and thereafter, the client 100 can access the storage device 210 via the file system (FS-1) of the server 220.

Next, description will be given of a server monitoring process for monitoring communications between the clients 100, 100a, . . . , 100n and the servers 220, 220a, . . . , 220n, for checking if the communications are kept normal (if any server is halted).

Figure 12:
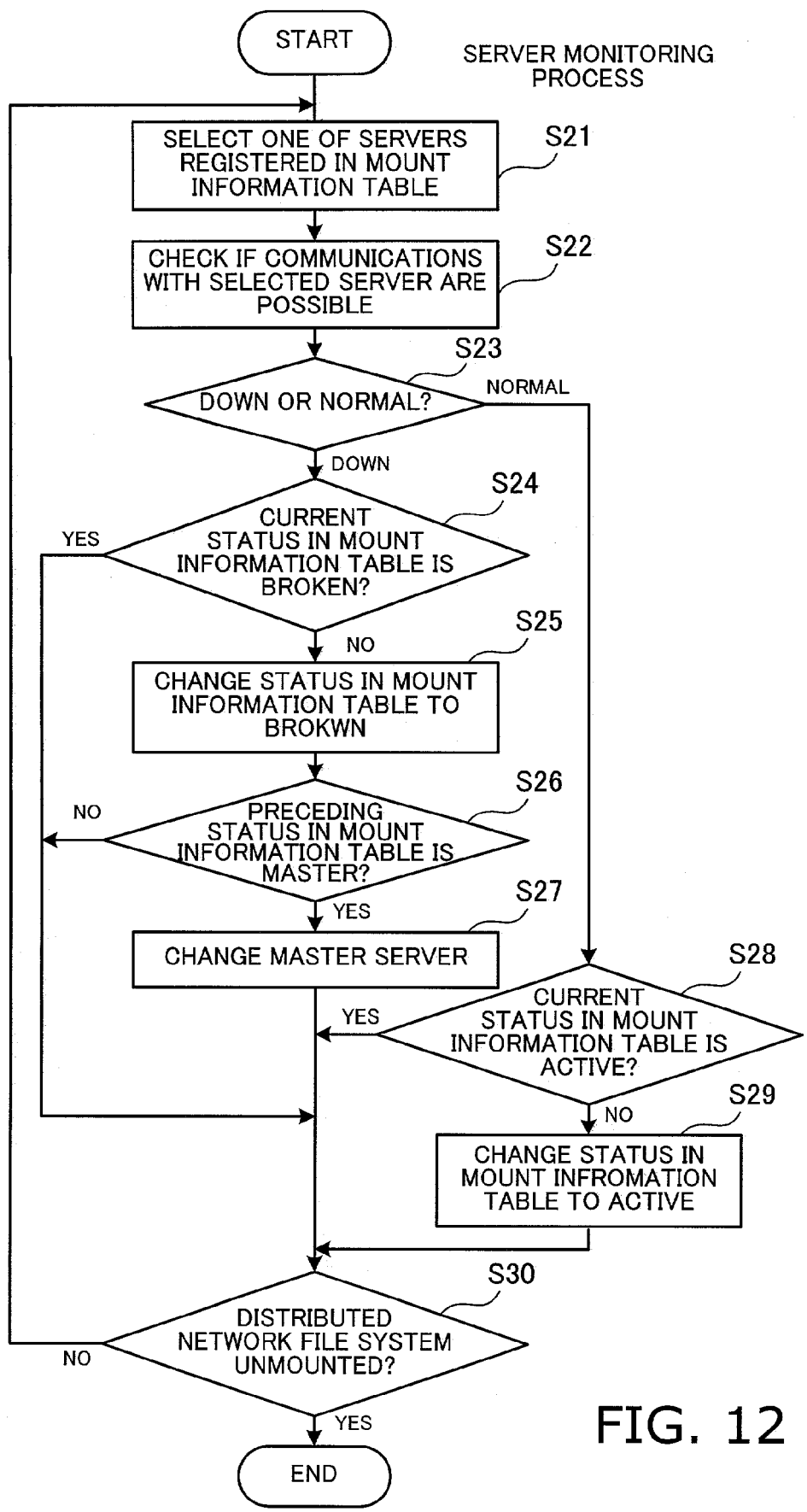
FIG. 12 is a flowchart showing a server monitoring process.

FIG. 12 is a flowchart showing the server monitoring process. The illustrated procedure of the process is common to the clients 100, 100a, . . . , 100n, and the description is given assuming that the client 100 carries out this process, in the order of step numbers.

[Step S21] The remote mount-constructing/monitoring section 110 of the client 100 selects one of the servers registered in the mount information table 120. The servers are repeatedly selected in the order of registration in the mount information table 120.

[Step S22] The remote mount-constructing/monitoring section 110 checks if communications between the selected server and the client 100 can be normally carried out. For instance, the remote mount-constructing/monitoring section 110 sends a packet to each server for checking the status thereof, and if a response to the packet is received from a server within a predetermined time period, it can be determined that the communications between the server and the client 100 can be normally carried out, whereas if the response is not received, it can be determined that the server is halted (down).

[Step S23] The remote mount-constructing/monitoring section 110 determines if the results of checking of communications between the servers and the client 100 are normal. If any server is down, the process proceeds to a step S24, whereas if the communications are normal, the process proceeds to a step S28.

[Step S24] The remote mount-constructing/monitoring section 110 checks the present status of the selected server in the mount information table 120. If the status is "BROKEN", the process proceeds to a step S30, whereas if the status is "ACTIVE" (including "MASTER"), the process proceeds to a step S25.

[Step S25] The remote mount-constructing/monitoring section 110 changes the status of a box in the mount information table 120 corresponding to the selected server to "BROKEN", and then the process proceeds to a step S26.

[Step S26] The remote mount-constructing/monitoring section 110 judges if the preceding status (status before the change in the step S25) of the selected server in the mount information table 120 was "MASTER". If the status was "MASTER", the process proceeds to a step S27, whereas if not, the process proceeds to the step S30.

[Step S27] The remote mount-constructing/monitoring section 110 changes the status of a server which is in a next place to the selected server in the sequence of registered servers in the mount information table 120 (server next to the bottom of the table is the first server at the top of the same) to "MASTER". Then, the process proceeds to the step S30.

[Step S28] The remote mount-constructing/monitoring section 110 checks the status of the server selected in the step S27 by looking up the mount information table 120. If the status is "ACTIVE", the process proceeds to the step S30, whereas if the same is "BROKEN", the process proceeds to a step S29.

[Step S29] The remote mount-constructing/monitoring section 110 changes the "status" of the box corresponding to the selected server in the mount information table 120 to "ACTIVE". Then, the process proceeds to the step S30.

[Step S30] The remote mount-constructing/monitoring section 110 judges if a process of unmounting the distributed network file system has been carried out. If the unmounting process has been carried out, the present process is terminated, if not, the process returns to the step S21.

Thus, the status of each server registered in the mount information table 120 is updated.

It should be noted that even if a server which has been halted is recovered from the halted status, and the status thereof become "ACTIVE", the alternate server node table 170 corresponding to the recovered server is held as it is. That is, as to files associated with a server which was halted or became down, the remote access continues to be carried out by alternate servers even after the down server has recovered. This is to ensure the consistency of the data in the storage device 210.

More specifically, in general, the servers have disk caches, and hold contents of files in the storage device 210 in their cash memories. If one file is accessed by a plurality of servers, the same file is held in the respective disk cashes of the servers, which makes it difficult to ensure the consistency of the file. To eliminate this inconvenience, in the present embodiment, a server which has been down is made incapable of accessing the file entrusted to the alternate server, to ensure the consistency of the file.

Next, the remote access process from a client to the SAN will be described.

Figure 13:
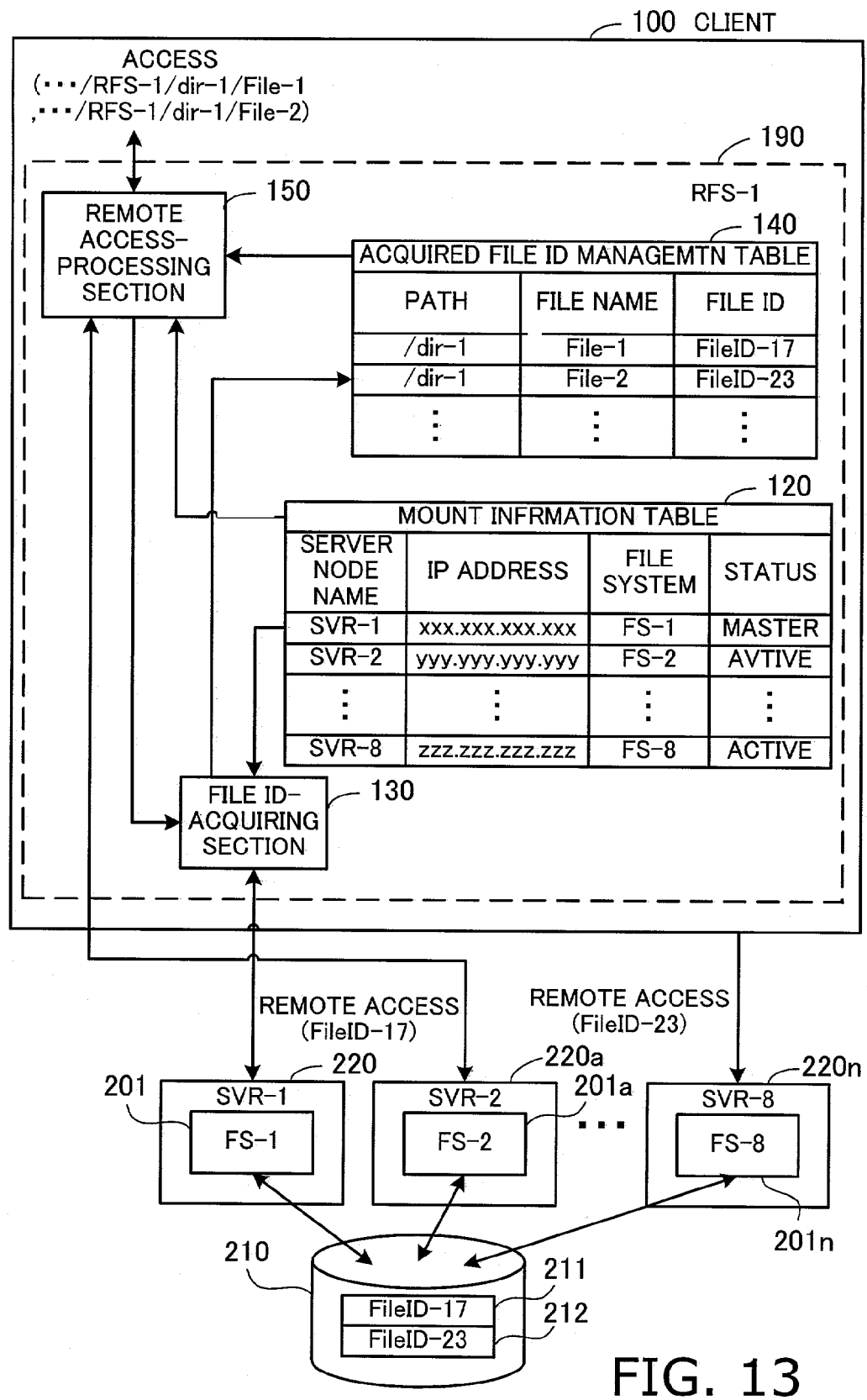
FIG. 13 is a conceptual representation of a state of access to a normally operating server.

FIG. 13 is a conceptual representation of the status of access to a normally operating server. FIG. 13 shows by way of example a status of the client 100 having remote mounted, by the distributed network file system 190 (e.g. "RFS-1"), a SAN 200 system in which a resource on the same storage device 210 is mounted on eight servers 220, 220a, . . . , 220n (server node names "SRV-1", "SRV-2", . . . , "SRV-8") by local file systems 201, 201a, . . . , 201n (e.g. "FS-1", "FS-2", . . . , "FS-8").

Now, a case will be described in which out of files stored in the storage device 210, a file 211 having a file ID number of 17 and a file 212 having a file ID number of 23 are accessed. For instance, when a process executing an application software program within the client 100 issues a request to access the files 211, 212. In this request, in succession to a path to a mount point where the distributed network file system 190 (RFS-1) is mounted, a path up to the files 211, 212 in the file system provided by the SAN 200 is designated, and further the names of the files 211, 212 (file names) are designated. This uniquely specifies the files 211, 212 as access targets.

When the access request is issued, the remote access-processing section 150 looks up the acquired file ID management table 140 to acquire the file ID numbers of the files 211, 212 as the target files. If the file ID numbers of the files 211, 212 have not been required in the acquired file ID management 140 yet, the remote access-processing section 150 issues a request to acquire the file ID numbers to the file ID-acquiring section 130.

Upon reception the request to acquire the file ID numbers, the file ID-acquiring section 130 issues a request for acquisition of the file ID numbers of the files 211, 212 to the master server (in the illustrated example, the server 220 is the master server). Then, the file ID number-providing section 223 (see FIG. 4) of the server 220 sends the file ID numbers "17" and "23" back to the file ID-acquiring section 130. The file ID-acquiring section 130 passes the acquired file ID numbers to the remote access-processing section 150, and at the same time registers the same in the acquired file ID management table 140.

After acquiring the file ID numbers of the files 211, 212, the remote access-processing section 150 determines a server which should carry out remote access to the files. More specifically, the numerical value of each file ID number is divided by the number of the servers, i.e. "8" in the present case, and adds 1 to the remainder. When the file ID number "17" is divided by 8, a remainder of 1 is obtained. When the file ID number "23" is divided by 9, a remainder of 7 is obtained. Therefore, the remote access to the file 211 is carried out via a server 220a which is in a second place (order corresponding to the number 2 obtained by the sum of the remainder of 1 plus 1) in the sequence of the registered servers, and the remote access to the file 212 is carried out via a server 220n which is in an eighth place (order corresponding to the number 8 obtained by the sum of the remainder of 7 plus 1) in the same sequence.

The remote access-processing section 150 looks up the mount information table 120, and determines if the respective statues of the target servers of the remote access, i.e. the servers 220a, 220n are "ACTIVE". If the statuses are "ACTIVE", the section 150 issues remote access requests to access the files 211, 212 to the servers 220a, 220n. If the remote access requests are requests to read, the respective file-providing sections 224 (see FIG. 4) of the servers 220a, 220n acquire the files 211, 212 from the storage device 210, and send the data of these files to the client 100. If the remote access requests are requests to write, the respective file-providing sections 224 of the servers 220a, 220n write data contained in the remote access requests into the files 211, 212 in the storage device 210, respectively.

Thus, it becomes possible for the client 100 to access the files 211, 212 in the storage device 210 provided by the SAN 200 via different paths of the files, respectively.

Next, the remote access process when a server (relay server) which should provide the service of remote access is halted or down will be described. When the target server for remote access is halted, another server is designated as the alternate server, and then the remote access which should have been made by the down server is carried out by the alternate server.

Figure 14:
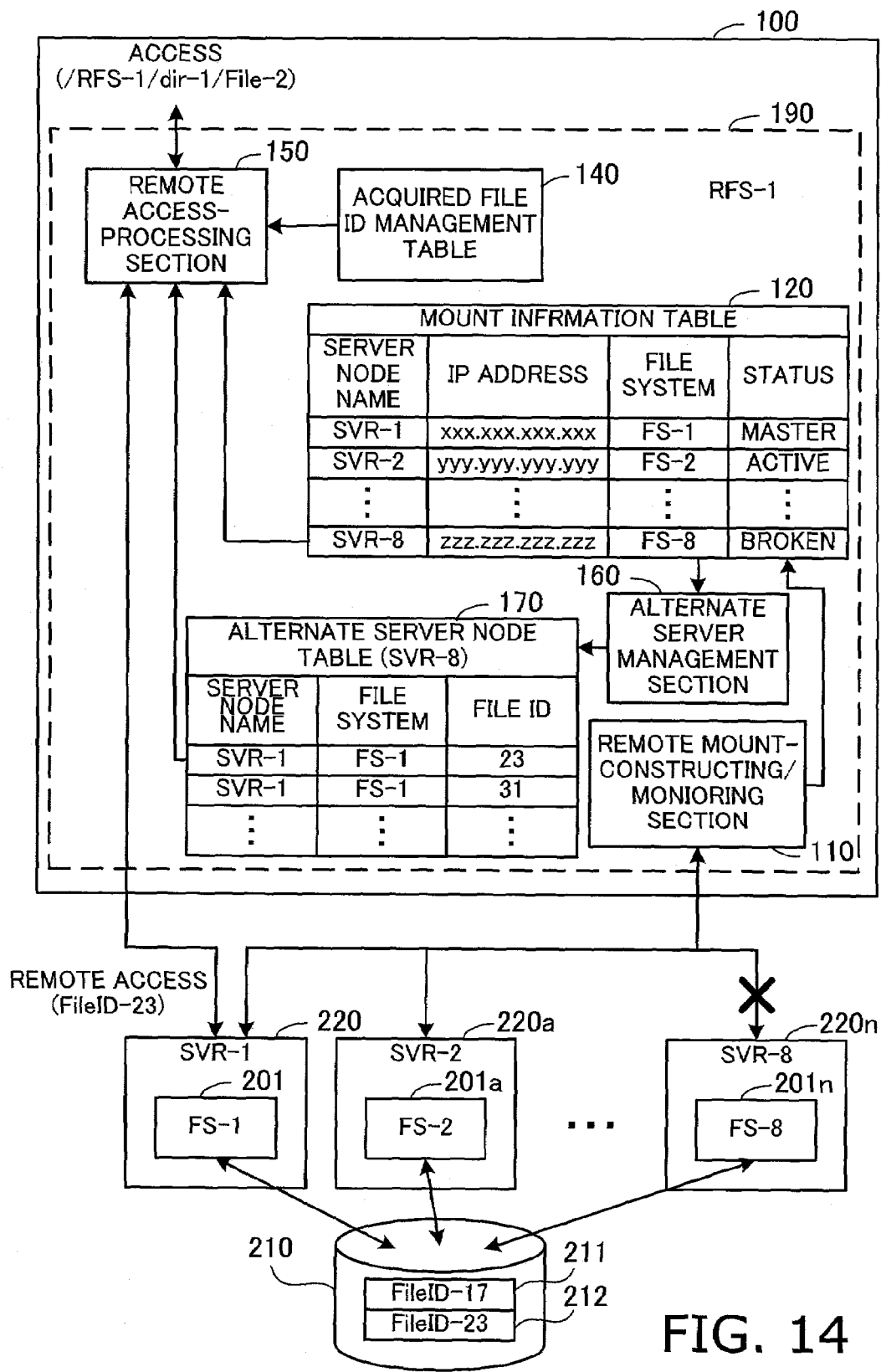
FIG. 14 is a conceptual representation of a state of access via an alternate server.

FIG. 14 is a conceptual representation of the status of access via the alternate server. The illustrated example shows a case when the server 220n is halted. When the server 220n is halted, the remote mount-constructing/monitoring section 110 of the client detects broken communication between the server 220n and the client 100. The section 110 changes the status of a box in the mount information table 120 corresponding to the server 220n (server node name "SVR-8") to "BROKEN".

Then, the alternate server management section 160 of the client 100 generates an alternate server node table 170 corresponding to the server 220n (server node name "SVR-8"). Thereafter, whenever a request for access to a file which should have been originally accessed by the server 220n is issued, the alternate server management section 160 registers the information concerning the file in the alternate server node table 170.

It should be noted that the alternate server is a server registered in a place next to the down server in the mount information table 120. However, when the down server is registered at the bottom of the mount information table 120, a server registered in a first place in the table 120 is determined to be the alternate server. In the illustrated example, the down server 220n is registered at the bottom of the table 120, and hence the server 220 (serve node name "SVR-1") registered at the top of the table 120 becomes the alternate server.

Thereafter, when a request for access to the file 212 (file ID number "23") is issued, as described hereinabove with reference to FIG. 13, the server 220n (serve node name "SVR-8") registered in the eighth place in the mount information table 120 is identified as the target server of the remote access. Responsive to the request for the remote access, the remote access-processing section 150 looks up the mount information table 120 to check the status of the server 220n, and since the status of the server 220n is "BROKEN", it looks up an alternate server node table 170 associated with the server 220n.

In the alternate server node table 170, the server node name "SVR-1" of the server 220 as the alternate server and the file system name "FS-1" have been registered, and hence the remote access-processing section 150 recognizes that the remote access to the file 212 should be carried out via the file system "FS-1" of the server 220 having the server node name "SVR-1", so that the section 150 issues a request for remote access to the file 212 to the server 220. Thereafter, the remote access to the file 212 is carried out via the server 220.

It should be noted that when the master server is halted, a server registered in a place next to the master server in the mount information table 120 or a server registered in the first place in the same when the master server is in the last place or at the bottom of the table 120 is caused to act as the master server for the down server. At this time, the remote mount-constructing/monitoring section 110 sets the status of the server which should become the master server to "MASTER".

It should be noted that when the down server 220n (server node name "SVR-8") is recovered, the status thereof in the mount information table 120 is changed to "ACTIVE", and the remote access via the server 220n becomes possible. However, the files once registered in the alternate server node table 170 are not permitted to be accessed via this server which was down even if it is recovered from the down status.

It is necessary that the files registered in the alternate server node table 170 by the client 100 are accessed by the other clients 100a, ..., 100n as well via the alternate server (the server 220 in the present case). Therefore, in the present embodiment, information of the alternate server node table 170 generated by the server 220 is distributed to the other clients 100a, ..., 100n. Hereafter, the passing of the information concerning files to which the remote access is carried out by the alternate server will be described.

Figure 15:
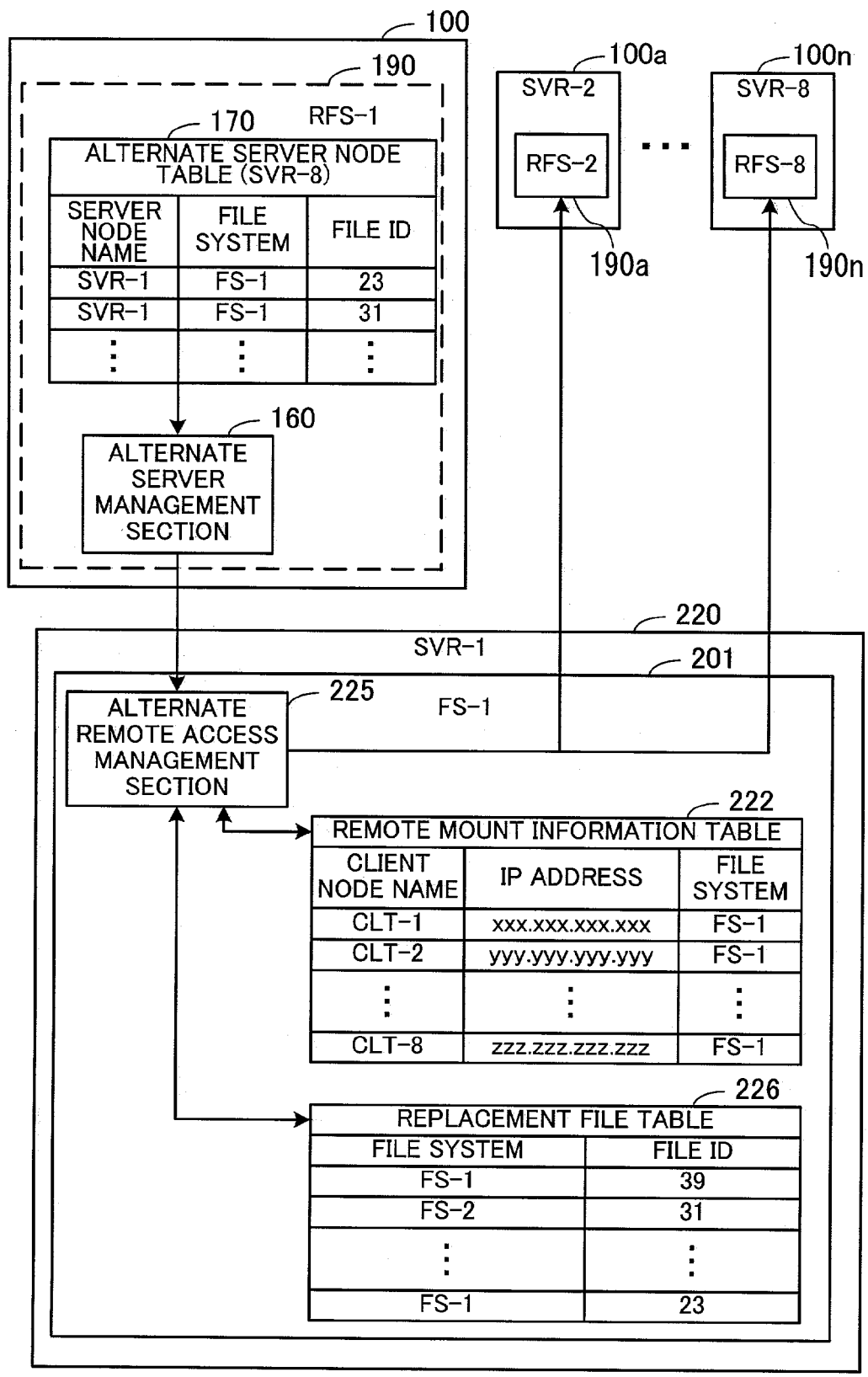
FIG. 15 is a conceptual representation of a state of passing of information concerning an alternate remote access.

FIG. 15 is a conceptual representation of the status of passing of information concerning the execution of remote access by an alternate server. As shown in FIG. 15, when the alternate server management section 160 generates an alternate server node table 170, it issues a request to generate a replacement file table 226 to the server 220 functioning as the alternate server in the case of the illustrated example. Responsive to this request, the alternate remote access management section 225 of the server 220 generates the replacement file table 226. The replacement file table 226 registers information (file system names and file ID numbers) of files to which the remote access is carried out by the server 220 as the alternate server.

Further, the alternate remote access management section 225 looks up the remote mount information table 222, and acquires information of clients which have remote-mounted the server 220 (except for the client which issued the request for preparation of the replacement file table 226). In the illustrated example, the distributed network file systems 190, 190a, ..., 190n (file system name "RFS-1", "RFS-2", ..., "RFS-8") of the eight clients 100, 100a, ..., 100n (client node names "CLT-1", "CLT-2", ..., "CLT-8") have remote-mounted the server 220.

The alternate remote access management section 225 issues a request to prepare an alternate server node table corresponding to the contents of the replacement file table 226 to the clients 100a, ..., 100n other than the client 100 which has issued the request for preparation of the replacement file table 226. Responsive to the request for preparation of the alternate server node table, the clients 100a, ..., 100n each generate an alternate server node table having the same contents as the alternate server node table 170 generated in the client 100 in a manner associated with the server 220.

Hereafter, whenever any of the clients 100, 100a, ..., 100n registers information of files in the alternate server node table associated with the server 220, information of these files is sent to the server 220 as the alternate server, where the replacement file table 226 is updated. Then, the information of the files newly registered in the replacement file table 226 is sent to the clients having remote-mounted the server 220 (except for the client which has sent the information of these files to the server 220), whereby the alternate server node table in each of them is updated.

This makes it possible for all the clients to carry out remote access to files in the storage device 210 via the same server even when one server has become down.

Next, a procedure of a remote file access process will be described.

Figure 16:
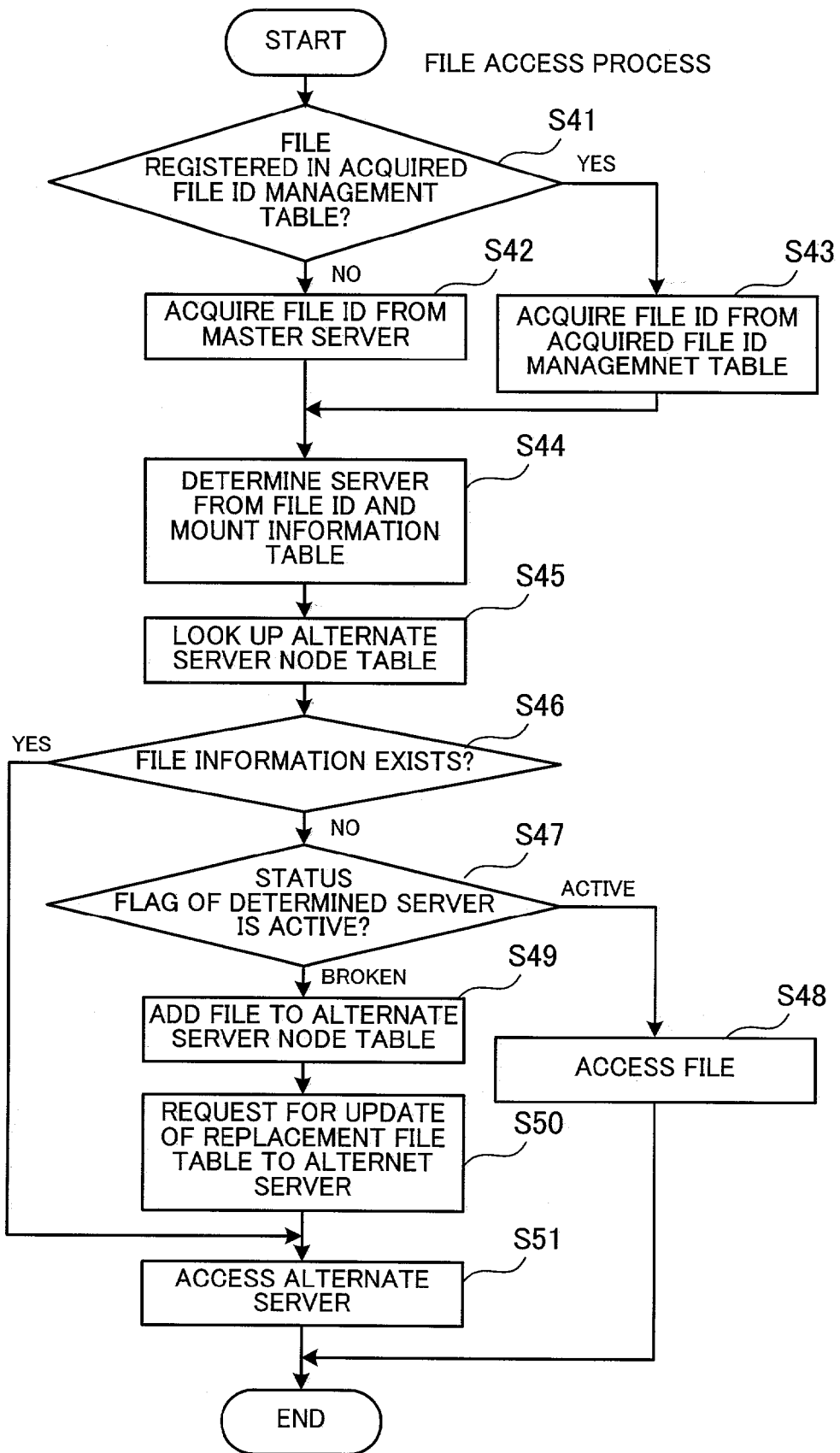
FIG. 16 is a flowchart showing a procedure of a remote file access process.

FIG. 16 is a flowchart showing the procedure. In the following, the illustrated process will be described in the order of step numbers. It should be noted that this process is executed by a client when the client has issued an access request for access to a file in the storage device 210 under the management of the SAN 200.

[Step S41] The remote access-processing section 150 determines whether or not the information of the file designated by the access request has been registered in the acquired file ID management table 140. If the table 140 contains the information of the designated file, the process proceeds to a step S43, whereas if not, the process proceeds to a step S42.

[Step S42] The remote access-processing section 150 acquires a file ID number from the master server via the file ID-acquiring section 130. More specifically, the remote access-processing section 150 issues a request to acquire the file ID number of the file designated by the access request to the file ID-acquiring section 130. In response to this request, the file ID-acquiring section 130 sends a request for acquisition of the file ID number to the master server together with the path of the file and the file name designated by the access request. Then, the file ID-acquiring section 130 passes the file ID number received from the master server to the remote access-processing section 150. Thereafter, the process proceeds to a step S44.

[Step S43] The remote access-processing section 150 looks up the acquired file ID management table 140, to acquire the file ID number of the file designated by the access request.

[Step S44] The remote access-processing section 150 determines a server to which a remote access request should be delivered, based on the numerical value of the acquired file ID number and the number of servers registered in the mount information table 120.

[Step S45] The remote access-processing section 150 of the client 100 looks up alternate server node tables 170 formed in a manner associated with respective halted servers.

[Step S46] The remote access-processing section 150 determines whether the information concerning the file having the file ID number acquired in the step S42 or S43 exists in any of the alternate server node tables 170. If the information of the file exists, the process proceeds to a step 51, whereas if not, the process proceeds to a step S47.

[Step S47] The remote access-processing section 150 determines whether a flag indicative of the status of the server determined in the step S44 indicates "ACTIVE" (including "MASTER") or "BROKEN". If the flag indicates "ACTIVE", the program proceeds to a step S48, whereas if the same indicates "BROKEN", the process proceed so a step S49.

[Step S48] The remote access-processing section 150 carries out remote access to the file designated by the remote access request via the server determined in the step S44, followed by terminating the process.

[Step S49] The alternate server management section 160 adds information of the target file to the alternate server node table 170 associated with the server determined in the step S44.

[Step S50] The alternate server management section 160 issues a request for update of a replacement file table to the alternate server registered in the alternate server node table 170 associated with the server determined in the step S44.

[Step S51] The remote access-processing section 150 carries out the remote access to the file designated by the remote access request via the alternate server, followed by terminating the process.

As described above, it is possible to determine a server which should relay remote access to files in the storage device 210 provided by the SAN 200, on a file-by-file basis. This makes it possible to reduce the bias or non-uniformity of remote access requests to servers and effectively carry out load distribution among the servers in the SAN 200. As a result, the overall processing efficiency of the whole SAN 200 is enhanced.

More specifically, assuming that all remote access requests issued by one client are processed by one server, if a certain client issues a larger number of access requests, the processing load on the associated server is increased, which results in a lowered speed of remote access processing by the server associated with the client.

In contrast, as in the present embodiment, when servers which relay remote access are different on a file-by-file basis, even if one client issues a large number of access requests, those remote access requests are processed by a plurality of servers 220, 220a, ..., 220n in a distributed fashion. As a result, processing load is distributed among the servers 220, 220a, ..., 220n, which prevents processing load from being increased on a particular server alone.

It should be noted that if the plurality of clients 100, 100a, ..., 100n carry out remote access to the same file during the same time period, the remote access processing for the file is carried out by one server. However, in this case, the data of the files can be cached within the server, which suppresses the increase in the processing load on the server. Moreover, if data of files remote-accessed by the clients 100, 100a, ..., 100n are cached in the clients, remote access from one client to one file does not occur continuously, which reduces the possibility of concentration of processing load on one server.

Further, in the present embodiment, when a server is halted, an alternate server for the halted server is determined, whereby the access path of the file is dynamically changed, so that the reliability of the file-providing process by the SAN 200 is enhanced.

Furthermore, an alternate server for a halted server is made uniform or identical for all the clients, and files accessed via the alternate server continue to be accessed by the alternate server even after the halted server has recovered. Therefore, remote access to one file via a plurality of servers does not occur during the same period, which ensures the consistency of data of the file.

It should be noted that the above processing function can be realized by a server computer and a client computer. To this end, a remote access request-processing program describing contents of processes to realize a function which the server computer should have and a remote access program describing contents of processes to realize a function which the client computer should have are provided. The remote access request-processing program is carried out by the server computer, whereby the processing function of the server described hereinabove as to the embodiment is realized. Also, the remote access program is carried out by the client computer, whereby the processing function of the client described in the embodiment is realized.

The remote access request-processing program and the remote access program which describe contents of processing described hereinabove can be each stored in a computer-readable storage medium. The computer-readable storage medium includes a magnetic recording device, an optical disk, a magneto-optical medium, a semiconductor memory, etc. The magnetic recording device includes a hard disk (HDD), a flexible disk (FD), and a magnetic tape. The optical disk includes a DVD (Digital Versatile Disk), a DVD-RAM (Random Access Memory), CD-ROM (Compact Disk Read Only Memory), and CD-R (Recordable)/RW (ReWritable). The magneto-optical disk includes an MO (Magneto-Optical disk).

To distribute the remote access request-processing program and the remote access program, they can be made available on the market in the form of data stored in portable recoding media, such as DVDs or CD-ROMs. Further, the remote access programs can be stored in a storage device of a server computer connected to a network, and transferred to client computers via the network.

The server computer which executes the remote access request-processing program stores this program recorded e.g. in a portable recording medium into a storage device of its own. Then, the server computer reads the program from the storage device and executes processing according to the program. It should be noted that the server computer can directly read the program from the portable recording medium to execute the processing according to the program.

The client computer which executes the remote access program stores the program which is read from a portable recording medium or transferred from a server computer, for instance, into a storage device of its own. Then, the client computer reads the program from the storage device and executes processing according to the program. It should be noted that the client computer can directly read the program from the portable recording medium to execute the processing according to the program. Further, a client computer can execute the processing according to the remote access program whenever it is received from the server computer.

As described heretofore, according to the present invention, by following a predetermined rule for distributing accesses to a storage device among a plurality of access paths on a file-by-file basis, a relay server computer which provides an access path to a file in the storage device is determined, and the file is accessed via the determined relay server computer. Therefore, requests for access to files in the storage device can be distributed among the plurality of server computers, which has enabled the distribution of load of remote access processing among the servers.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A remote access program for accessing a common storage device via a plurality of server computers each providing a function of accessing the common storage device, wherein the remote access program causes a client computer to execute a process for:

defining a plurality of access paths to the storage device via the respective server computers;

determining, when an access request designating a file within the storage device is received, a relay server computer, which is one of the server computers, providing an access path to the file according to a predetermined rule for distributing accesses to the storage device among the plurality of access paths on a file-by-file basis; and accessing the file within the storage device by the determined access path via the determined relay server computer;

wherein the predetermined rule is a calculating equation using an identification number set to the file in advance and a number of the server computers proving the access paths as variables.

2. The remote access program according to claim 1, wherein when the relay server computer is halted, an alternate server computer for carrying out processing of the halted relay server computer for remote access in place thereof is determined from the server computers, and wherein the file within the storage device designated by the access request is accessed by the access path via the determined alternate server computer.

3. The remote access program according to claim 2, wherein when a notification that the alternate server computer carries out the processing for the remote access to a predetermined file in the storage device in place of the halted relay server computer is received, the access to the predetermined file indicated by the notification which occurs thereafter is carried out via the alternate server computer.

4. A remote access program according to claim 1, wherein if the access request is for writing to the file, then a new contents of the file is transferred to the server computer when the access request is sent.

5. A client computer for accessing a common storage device via a plurality of server computers each providing a function of accessing the common storage device, the client computer comprising:

access path defining means for defining a plurality of access paths to the storage device via the respective server computers;

access path-determining means for determining, when an access request designating a file within the storage device is received, a relay server computer, which is one of the server computers, providing an access path to the file according to a predetermined rule for distributing accesses to the storage device among the plurality of access paths defined by said access path-defining means on a file-by-file basis; and remote access means for accessing the file within the storage device by the access path determined by said access path-determining means via the determined relay server computer;

wherein the predetermined rule is a calculating equation using an identification number set to the file in advance and a number of the server computers providing the access paths as variables.

6. A client computer according to claim 5, wherein if the access request is for writing to the file, then a new contents of the file is transferred to the server computer when the access request is sent.

7. A remote access method for accessing a common storage device via a plurality of server computers each providing a function of accessing the common storage device, the method comprising the steps of:
defining a plurality of access paths to the storage device via the respective server computers;
determining, when an access request designating a file within the storage device is received, a relay server computer, which is one of the server computers, providing an access path to the file according to a predetermined rule for distributing accesses to the storage device among the plurality of access paths on a file-by-file basis; and
accessing the tile within the storage device by the determined access path via the determined relay server computer;
wherein the predetermined rule is a calculating equation using an identification number set to the file in advance and a number of the server computers providing the access paths as variables.

8. A remote access method according to claim 7, wherein if the access request is for writing to the file, then a new contents of the file is transferred to the server computer when the access request is sent.

9. A computer-readable storage medium storing a remote access program for accessing a common storage device via a plurality of server computers each providing a function of accessing the common storage device, wherein the remote access program causes a client computer to execute a process for;
defining a plurality of access paths to the storage device via the respective server computers;
determining, when an access request designating a file within the storage device is received, a relay server computer, which is one of the server computers, providing an access path to the file according to a predetermined rule for distributing accesses to the storage device among the plurality of access paths on a file-by-file basis; and
accessing the file within the storage device by the determined access path via the determined relay server computer;
wherein the predetermined rule is a calculating equation using an identification number set to the file in advance and a number of the server computers providing the access paths as variables.

10. A computer-readable storage medium according to claim 9, wherein if the access request is for writing to the file, then a new contents of the file is transferred to the server computer when the access request is sent.

* * * * *